United States Patent [19]

Iwata et al.

[11] Patent Number: 5,430,080
[45] Date of Patent: Jul. 4, 1995

[54] FLAME-RETARDANT THERMOPLASTIC RESIN COMPOSITION

[75] Inventors: Masuo Iwata; Noriaki Narita; Kouji Inoue, all of Kanagawa; Ryoji Takahashi, Tokyo, all of Japan

[73] Assignee: Chisso Corporation, Osaka, Japan

[21] Appl. No.: 251,195

[22] Filed: May 31, 1994

[30] Foreign Application Priority Data

Jun. 1, 1993 [JP]   Japan .................................. 5-154302

[51] Int. Cl.$^6$ ......................................... C08K 53/3492
[52] U.S. Cl. ................................. 524/100; 524/415; 524/416; 523/205
[58] Field of Search ..................... 524/100, 415, 416

[56] References Cited

U.S. PATENT DOCUMENTS

| | | | |
|---|---|---|---|
| 3,562,197 | 2/1971 | Sears et al. | 524/415 |
| 3,936,420 | 2/1976 | Gray | 524/416 |
| 4,101,485 | 7/1978 | Brooks et al. | 524/416 |
| 4,193,945 | 3/1980 | Bertelli et al. | |
| 4,198,493 | 4/1980 | Marciandi | 524/416 |
| 4,312,805 | 1/1982 | Bertelli et al. | 524/416 |
| 4,504,610 | 3/1985 | Fontanelli et al. | |
| 4,871,795 | 10/1989 | Pawar | |
| 4,966,931 | 10/1990 | Akitaya et al. | 524/416 |
| 5,116,891 | 5/1992 | Eberspach et al. | 524/416 |
| 5,130,357 | 7/1992 | Akitaya et al. | 524/416 |
| 5,200,445 | 4/1993 | Cipolli et al. | 524/416 |
| 5,224,464 | 7/1993 | Hill | 524/416 |
| 5,302,641 | 4/1994 | Cipolli et al. | 524/416 |

FOREIGN PATENT DOCUMENTS 0014463  8/1980  European Pat. Off.
0475418  3/1992  European Pat. Off.

OTHER PUBLICATIONS

PCT Publication No. WO85/05626 of Dec. 19, 1985.
WPI/Derwent, Abstract No. 91-206863, "Fire Retardant Composition . . . of Triazine Derivatives" of (Japanese Patent Document No. JP-A-6 056 988).

*Primary Examiner*—Veronica P. Hoke
*Attorney, Agent, or Firm*—Leydig, Voit & Mayer

[57] ABSTRACT

A flame-retardant thermoplastic resin composition comprising,
(A) 10 to 40% by weight of a melamine-coated ammonium polyphosphate having melamine added and/or adhered onto the particle surfaces of a powdery ammonium polyphosphate expressed by the following formula (I):

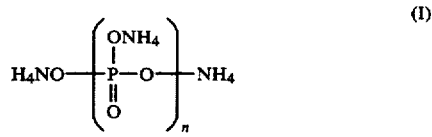

wherein n is an integer of 2 or more,
(B) 1 to 20% by weight of a triazine-containing polymer, and
(C) 89 to 40% by weight of a thermoplastic resin, the total amount of these components being 100% by weight.

19 Claims, No Drawings

FLAME-RETARDANT THERMOPLASTIC RESIN COMPOSITION

FIELD OF THE INVENTION

The present invention relates to a thermoplastic resin composition excellent in bleed resistance and flame retardancy. More particularly, it relates to a thermoplastic resin composition which comprises specific amounts of (A) a melamine-coated ammonium polyphosphate, (B) a nitrogen-containing organic compound and (C) a thermoplastic resin and is excellent in bleed resistance and flame retardancy.

BACKGROUND OF THE INVENTION

Due to their superiority in processability, chemical resistance, weatherability, electrical properties, mechanical strength, etc., thermoplastic resins have so far been used extensively not only in the field of industrial and domestic electrical products but also in various fields including buildings, interior decorative articles and automotive parts, and the applications in which thermoplastic resins are used have been expanding. With the expansion of applications, the thermoplastic resins also have come to be required to have flame retardancy and the performance requirement has been becoming severer year by year. Recently in particular, a flame-retardant resin composition comprising a thermoplastic resin and a halogen-containing compound or a flame-retardant resin composition comprising a thermoplastic resin, a halogen-containing compound and an antimony oxide, which compositions each are a main current in the conventional flame retardation technology, are regarded as defective because they generate a halogenous gas during combustion or molding. Accordingly, a flame-retardant resin composition which does not generate such a halogenous gas during combustion or molding has come to be desired.

In order to meet these requirements, a flame-retardant resin composition containing ammonium polyphosphate and one or more nitrogen-containing organic compounds which generate nonflammable gases (water, carbon dioxide, ammonia, nitrogen, etc.) and a carbonaceous residue upon pyrolysis has been proposed from recent investigations. For example, a flame-retardant composition comprising a polymer or oligomer of a 1,3,5-triazine derivative and ammonium polyphosphate is proposed in JP-A-59-147050 (corresponding to U.S. Pat. No. 4,504,610) (The term "JP-A" as used herein means an "unexamined published Japanese patent application") and EP-A-0475418; a flame-retardant composition comprising ammonium polyphosphate and a reaction product of a nitrogen compound having a >C=O, >C=S or >NH group bonded to a cyclic structure with an aldehyde is proposed in JP-A-52-146452 (corresponding to U.S. Pat. No. 4,193,945); a flame-retardant composition comprising ammonium polyphosphate and a product of the reaction of benzylguanamine with an aldehyde is proposed in JP-A-55-129435 (corresponding to European Patent 14463); and a flame-retardant composition comprising an isocyanuric acid derivative and ammonium polyphosphate is proposed in JP-A-54-53156 (corresponding to U.S. Pat. No. 4,198,493).

Further, as a combination containing no nitrogen compound, JP-A-64-14277 (corresponding to U.S. Pat. No. 4,871,795) proposes a flame-retardant composition comprising a high-viscosity silicone oil, a silicone resin, a polyol and an ammonium phosphate.

However, although the conventional flame-retardant compositions enumerated above have high flame retardancy, the ammonium polyphosphate in the compositions is so subject to hydrolysis because of the chemical structure thereof that molded materials obtained from the compositions under high-temperature and high-humidity conditions, e.g., in the rainy season, undergo a phenomenon in which the ammonium polyphosphate severely bleeds to the surfaces of the molded materials due to its hygroscopicity, solubility in water, and hydrolyzability. Further, the flame-retardant resin composition described in EP-A-0475418 has a drawback that since the nitrogen-containing organic compound contained therein has hygroscopicity, the ammonium polyphosphate is subject to hydrolysis and the hydrolyzate is apt to bleed to the surface of a molded material obtained from the composition and, as a result, the molded material comes to have a greatly reduced electrical surface resistance and is hence unusable as an electrical insulating material or the like under high-temperature and high-humidity conditions.

SUMMARY OF THE INVENTION

As apparent from the above description, an object of the present invention is to provide a thermoplastic resin composition excellent in bleed resistance and flame retardancy and free from the bleeding of ammonium polyphosphate to the surfaces of molded materials, which bleeding phenomenon has been inherent in molded materials obtained from compositions comprising a thermoplastic resin and ammonium polyphosphate.

The present inventors conducted intensive studies in order to obtain a flame-retardant thermoplastic resin composition which, though it contains ammonium polyphosphate, gives a molded material which does not suffer bleeding phenomenon even under high-temperature and high-humidity conditions. As a result, it has been found that the subject described above can be attained without reducing the flame retardancy of molded materials nor causing generation of a decomposition gas etc. during combustion or molding, by using in place of the conventional ammonium polyphosphate, a melamine-coated ammonium polyphosphate obtained by sublimating melamine and adding and/or adhering it to the particle surfaces of powdery ammonium polyphosphate. The present invention has been completed based on this finding.

The present invention resides in the following items of 1) to 7):

1) A flame-retardant thermoplastic resin composition comprising,
   (A) 10 to 40% by weight of a melamine-coated ammonium polyphosphate having melamine added and/or adhered to i.e., coated on, the particle surfaces of a powdery ammonium polyphosphate expressed by the following formula (I):

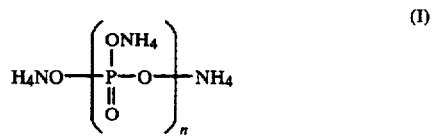

wherein n is an integer of 2 or more, (B) 1 to 20% by weight of a nitrogen-containing compound, and (C) 89 to 40% by weight of a thermoplastic resin, the total amount of these components being 100% by weight.

2) A flame-retardant thermoplastic resin composition as described in item 1) above, wherein the amount of the melamine used in coating the particle surfaces of the powdery ammonium polyphosphate is 0.5 to 20% by weight based on the amount of the powdery ammonium polyphosphate.

3) A flame-retardant thermoplastic resin composition as described in item 1) above, wherein the melamine-coated ammonium polyphosphate is obtained by sublimating melamine and adding and/or adhering it onto the particle surfaces of powdery ammonium polyphosphate.

4) A flame-retardant thermoplastic resin composition as described in item 1) above, wherein the melamine-coated ammonium polyphosphate has an average particle size of 15 μm or smaller.

5) A flame-retardant thermoplastic resin composition as described in item 1) above, wherein the nitrogen-containing organic compound is a homopolymer and/or a copolymer which each has a monomer structure as the main units, expressed by the following formula (II):

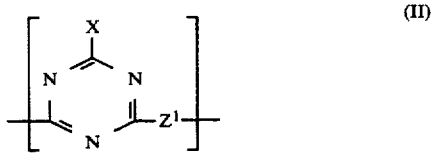

(II)

wherein X and $Z^1$ each are a structure bonded to the triazine skeleton through a nitrogen atom; X is an alkylamino group represented by $-NHR^1$ or $-NR^2R^3$ wherein $R^1$, $R^2$ and $R^3$ each are a linear or branched alkyl group having 1 to 6 carbon atoms and $R^2$ and $R^3$ may be same or different, a morpholino group, or a piperidino group, or X is a hydroxyalkylamino group represented by $-NHR^4$ or $-NR^5R^6$ wherein $R^4$, $R^5$ and $R^6$ each are a linear or branched hydroxyalkyl group having 2 to 6 carbon atoms and $R^5$ and $R^6$ may be same or different; and $Z^1$ is a divalent group of piperazine, a divalent group represented by $-HN(CH_2)_mNH-$ wherein m is an integer of 2 to 6 or a group represented by $-NR^7(CH_2)_lR^8N-$ wherein either one of $R^7$ and $R^8$ is a hydroxyethyl group and another is a hydrogen atom or both of $R^7$ and $R^8$ are a hydroxyethyl group and l is an integer of 2 to 6.

6) A flame-retardant thermoplastic resin composition as described in item 1) above, wherein the nitrogen-containing organic compound is a reaction product obtained by reacting cyanuric chloride with a diamine.

7) A flame-retardant thermoplastic resin composition as described in item 1) above, wherein the thermoplastic resin is selected from the group consisting of olefin resins, styrene resins and a mixture of two or more of these.

DETAILED DESCRIPTION OF THE INVENTION

The melamine-coated ammonium polyphosphate of component (A) used in the present invention comprises powdery ammonium polyphosphate expressed by the formula (I) shown above and melamine used in coating the powder particles. This melamine-coated ammonium polyphosphate can be obtained by the following method. In the first stage, powdery ammonium polyphosphate expressed by the formula (I) is introduced into a heating and kneading device, e.g., a preheated kneader, and the ammonium polyphosphate particles are heated for 0.5 to 5 hours at such a temperature that the particles do not melt and the ammonium polyphosphate readily undergoes the elimination of ammonia therefrom, i.e., at 300° C. or lower, preferably from 200° to 300° C., to thereby eliminate part of the ammonia originally present in the ammonium polyphosphate in the stoichiometric amount (i.e., 5–10% by weight of the stoichiometric amount of ammonia is eliminated). Thus, an ammonium polyphosphate from which the ammonia has been partly eliminated, i.e., an ammonium polyphosphate deficient in ammonia, whose 1 wt % aqueous suspension has a pH of 4.0 to 6.0 is produced, or an ammonium polyphosphate in which the combined ammonia amount is smaller than the stoichiometric amount in a known process for ammonium polyphosphate production as disclosed in U.S. Pat. Nos. 4,396,586 and 5,213,783 is produced. (These polyphosphates will hereinafter be referred to as ammonia-deficient ammonium polyphosphate.) In the subsequent second stage, the ammonia-deficient ammonium polyphosphate particles are heated in the same device at such a temperature that the particles do not melt and melamine is capable of sublimating, i.e., at 250° to 300° C., and melamine is mixed therewith to cause the melamine to be added and/or adhered to i.e., coated on, a proton of a proton-oxygen bond resulting from the elimination of ammonia and present on the surfaces of the ammonia-deficient ammonium polyphosphate particles.

The addition of melamine herein means ionic bonding of the melamine to the proton of a proton-oxygen bond derived from the ammonium polyphosphate, and the melamine that has been added is thermally stable and is never eliminated again by heating. The adhesion of melamine means adsorption of the melamine on the surfaces of the ammonium polyphosphate particles, and the melamine adsorbed on the surfaces of the ammonium polyphosphate particles undergoes sublimation and adsorption repeatedly with continuous heating and is eventually ionically bonded to the proton of proton-oxygen bond. The proportion of the melamine to be used is 0.5 to 20% by weight, preferably 2 to 10% by weight, based on the amount of the ammonium polyphosphate. All of the melamine used undergoes addition and/or adhesion onto the ammonium polyphosphate to thereby obtain the melamine-coated ammonium polyphosphate.

As the ammonium polyphosphate used as a raw material for the melamine-coated ammonium polyphosphate of the present invention, an ordinary ammonium polyphosphate product on the market may be employed. Examples of the commercial product include SUMISAFE P (trademark, manufactured by Sumitomo Chemical Co., Ltd.), EXOLIT 422 (trademark, manufactured by Hoechst AG), EXOLIT 700 (trademark, manufactured by Hoechst AG), and PHOS-CHECK P 40

(trademark, manufactured by Monsanto Co., Ltd.). Also usable is the finely powdered II-type ammonium polyphosphate as described in JP-A-4-300204 (corresponding to U.S. Pat. No. 5,213,783). The finely powdered II-type ammonium polyphosphate can be obtained, for example, by the following method. That is, equimolar amounts of diammonium hydrogen phosphate and phosphorus pentoxide ($P_2O_5$) are mixed together and the mixture is heated to a temperature of 290° to 300° C. with stirring. A 77 wt % urea solution containing urea in a molar amount of 0.5 times the amount of the diammonium hydrogen phosphate is then added thereto by spraying, and the mixture is subsequently heated in an ammonia atmosphere for several hours at a temperature of 250° to 270° C. to obtain the desired particles.

As the melamine, a melamine monomer product on the market may be used.

The proportion of the melamine-coated ammonium polyphosphate to be incorporated is usually 10 to 40% by weight, preferably 15 to 25% by weight, based on the amount of the composition. If the amount thereof incorporated is below 10% by weight, sufficient flame retardancy cannot be obtained. Even if the incorporated amount thereof exceeds 40% by weight, almost no further improvement is attained in flame retardancy.

The nitrogen-containing organic compound of component (B) used in the present invention is an organic compound which, when it is present in a thermoplastic resin along with the melamine-coated ammonium polyphosphate, generates nonflammable gases (water, carbon dioxide, ammonia, nitrogen, etc.) upon pyrolysis by ignition, contact with a flame, etc. to form a carbonaceous residue only. Specifically, the organic compound may be a homopolymer and/or a copolymer in which each have a monomer structure expressed by the formula (II) shown hereinabove as the main unit. Examples thereof include a homopolymer of 2-piperazinylene-4-morpholino-1,3,5-triazine, 2-piperazinylene-4-piperidino-1,3,5-triazine, 2-piperazinylene-4-N,N-bis(-hydroxyethyl)amino-1,3,5-triazine or 2-piperazinylene-4-N-hydroxyethylamino-1,3,5-triazine and copolymers of these monomers. Also usable is a product of the reaction of cyanuric chloride with a diamine preferably in a molar ratio of 2:3, e.g., a reaction product obtained by reacting cyanuric chloride with ethylenediamine in a molar ratio of 2:3 or a reaction product obtained by reacting cyanuric chloride with 1,3-diaminopropane in a molar ratio of 2:3.

Besides the nitrogen-containing organic compounds described above, there may be incorporated known nitrogen-containing organic compounds such as a reaction product of a nitrogen compound having $>C=O$, $>C=S$ or $>NH$ group bonded to a cyclic structure with an aldehyde, a reaction product of benzylguanamine with an aldehyde, or an isocyanuric acid derivative such as tris(2-hydroxyethyl)isocyanurate, tris(3-hydroxy-N-propyl)isocyanurate or tris(2,3-epoxypropyl)isocyanurate. It is also possible to incorporate, in place of the nitrogen-containing organic compound, a high-viscosity silicone oil and/or a silicone resin and a polyol. The polyol may also be replaced with magnesium stearate. The high-viscosity silicone oil herein means a substantially linear polydimethylsiloxane polymer having a viscosity of about 90,000 to 150,000 cP at 25° C., while the silicone resin means an MQ silicone resin consisting of monofunctional units, M units, represented by $(R^9)_3SiO_{0.5}$ and quadrifunctional units, Q units, having the average formula $SiO_2$, with the ratio of the M units to the Q units being 0.3 to 0.4. Examples of the polyol include pentaerythritol, dipentaerythritol and tripentaerythritol. These silicone oil, silicone resin, polyol, etc. are not particularly limited, and ordinary products on the market are usable as they are.

The proportion of the component (B) to be incorporated is usually 1 to 20% by weight based on the amount of the composition. If the amount thereof incorporated is below 1% by weight, sufficient flame retardancy cannot be obtained. Even if the incorporated amount thereof exceeds 20% by weight, almost no further improvement is attained in flame retardancy.

The homopolymer of 2-piperazinylene-4-morpholino-1,3,5-triazine mentioned above as an example of the nitrogen-containing organic compound, may be obtained as follows. Equimolar amounts of a 2,6-dihalo-4-morpholino-1,3,5-triazine (e.g., 2,6-dichloro-4-morpholino-1,3,5-triazine or 2,6-di-bromo-4-morpholino-1,3,5-triazine) and piperazine are reacted with heating in an inert solvent, e.g., xylene, in the presence of an organic or inorganic base (e.g., triethylamine, tributylamine, sodium hydroxide, potassium hydroxide or sodium carbonate). After completion of the reaction, the reaction mixture is filtered to separate a solid, which is washed with boiling water to remove the by-product salt and is then dried. The thus-obtained homopolymer of 2-piperazinylene-4-morpholino-1,3,5-triazine is insoluble in ordinary organic solvents, has no melting points, and has a decomposition temperature of about 304° C. and a true density of 1.3 g/cc.

In the case of obtaining the homopolymer of 2-piperazinylene-4-bis(hydroxyethyl)amino-1,3,5-triazine, the same method as the above can be employed in which a 2,6-dihalo-4-bis(hydroxyethyl)amino-1,3,5-triazine is used as a raw material.

Further, for obtaining a copolymer of 2-piperazinylene-4-morpholino-1,3,5-triazine with 2-piperazinylene-4-bis(hydroxyethyl)amino-1,3,5-triazine, the same method as the above can be employed in which a mixture of a 2,6-dihalo-4-morpholino-1,3,5-triazine and a 2,6-dihalo-4-bis(hydroxyethyl)amino-1,3,5-triazine is used as a raw material. By mixing the 2,6-dihalo-4-morpholino-1,3,5-triazine and the 2,6-dihalo-4-bis(hydroxyethyl)amino-1,3,5-triazine in any desired ratio, a copolymer having any monomer-unit composition ratio is obtained.

The reaction product between cyanuric chloride and ethylenediamine may be obtained as follows. Cyanuric chloride is reacted with ethylenediamine in a molar ratio of 2:3 in water as a solvent in the presence of an organic or inorganic base (e.g., triethylamine, tributylamine, sodium hydroxide, potassium hydroxide or sodium carbonate). The reaction is initiated at a temperature of 10° C. or lower and the reaction mixture is thereafter heated slowly to the reflux temperature to carry out the reaction. After completion of the reaction, the reaction mixture is filtered to separate a solid, which is washed with boiling water to remove the by-product salt and is then dried. The reaction product obtained is insoluble in organic solvents and its solubility in water at room temperature is also as low as 0.1% by weight or less. Further, its decomposition temperature is about 324° C.

Preferred examples of the thermoplastic resin of component (C) used in the present invention include one or more resins selected from the group consisting of a polyethylene resin, polypropylene resin, poly(1-butene)

resin, poly(4-methyl-1-pentene) resin, poly(1-hexene) resin, poly(1-octene) resin and poly(1-decene) resin, a mixture of two or more of these resins, polystyrene, an acrylonitrile-butadiene-styrene copolymer (ABS resin), and an acrylonitrile-styrene copolymer (AS resin).

Preferred as the polypropylene resin is crystalline propylene homopolymer, a crystalline copolymer of propylene as the main component with at least one monomer selected from the group consisting of ethylene, butene-1, pentene-1, hexene-1, 4-methylpentene-1, heptene-1, octene-1 and decene-1, or a mixture of two or more of these polymers.

In the flame-retardant thermoplastic resin composition of the present invention, various additives ordinarily added to thermoplastic resins may also be suitably used such as, for example, an antioxidant, ultraviolet absorber, antistatic agent, copper deactivator, lubricant, neutralizing agent (e.g., a metal salt of stearic acid, hydrotalcite or manasseite), inorganic filler and pigment.

The flame-retardant thermoplastic resin composition of the present invention may be produced, for example, by the following method. That is, the melamine-coated ammonium polyphosphate and nitrogen-containing organic compound described above are placed into any of various stirring mixers, e.g., a Henschel mixer (trade name), supermixer or tumbling mixer, along with a thermoplastic resin, and the ingredients are then mixed by stirring for 1 to 10 minutes to obtain the desired composition. It is also possible to melt-knead the thus-obtained mixture at a temperature of 170° to 220° C. by means of rolls, screw extruder or the like and pelletize the melt to obtain the desired flame-retardant composition of pellet form.

Examples and Comparative Examples will be given below in order to explain the present invention in detail, but these examples should not be construed as limiting the present invention. The evaluation methods used in the Examples and Comparative Examples are as follows.

1) Flame Retardancy

According to the vertical combustion test prescribed in "Combustion Test of Plastic Materials for Appliance Parts" in UL Subject 94 (Underwriters Laboratories Incorporated). The test piece thickness was 1.6 mm (1/16 inch).

2) Hot-water Immersion Test

Test pieces (100 mm (length) by 100 mm (width) by 2 mm (thickness)) were molded with an injection molding machine, and the electrical surface resistivities thereof were measured with a vibrating reed electrometer (Takeda Riken Industry Co., Ltd.). Subsequently, the test pieces were immersed in 95° C. hot water for 2 hours and then taken out, and the water droplets adherent to the test pieces were wiped off with a wiping paper. The electrical surface resistivities of the resulting test pieces were measured. Samples that underwent a considerable decrease in electrical surface resistivity after the hot-water immersion were regarded as poor in bleed resistance.

3) Bleed Resistance

Test pieces (100 mm (length) by 100 mm (width) by 2 mm (thickness)) were molded with an injection molding machine, and the electrical surface resistivities thereof were measured with a vibrating reed electrometer (Takeda Riken Industry Co., Ltd.). Subsequently, the test pieces were allowed to stand in a thermo-hygrostatic chamber regulated to have a temperature of 80° C. and a relative humidity of 80%, and were taken out after the lapse of predetermined time periods. The test pieces taken out were dried for 2 hours in a thermostatic drying chamber regulated to have a temperature of 80° C., and the electrical surface resistivities of the resulting test pieces were measured.

Samples that underwent a considerable decrease in electrical surface resistivity after withdrawal from the thermo-hygrostatic chamber were regarded as poor in bleed resistance under high-temperature and high-humidity conditions. These samples were exposed to the high-temperature and high-humidity conditions to examine the number of days required for the electrical surface resistivity to decrease.

The melamine-coated ammonium polyphosphate (A1) used in the examples of the present invention was obtained by treating finely powdered II-type ammonium polyphosphate by the following method.

That is, 2,000 parts by weight of finely powdered II-type ammonium polyphosphate (A2) having an average particle size of 6.4 µm was introduced into a kneader preheated to 280° C., and stirred with heating in a nitrogen gas atmosphere or inert gas atmosphere for 3 hours to eliminate ammonia. To this ammonium polyphosphate powder in which the ammonia amount was smaller than the stoichiometric amount, 200 parts by weight of melamine was added. The upper lid of the kneader was put on at this time, and the ingredients were heat-mixed at 280° C. for 4 hours in the kneader kept in that state. This heat-mixing was conducted without changing the type of the ammonium polyphosphate. Thus, 2,100 parts by weight of a melamine-coated ammonium polyphosphate was obtained.

The finely powdered II-type ammonium polyphosphate (A2) mentioned above was obtained by the following method. That is, 660 g (5 mol) of diammonium hydrogen phosphate and 710 g (5 mol) of phosphorus pentoxide ($P_2O_5$) were placed in a table kneader heated to 290° to 300° C. and having a capacity of 5 liters and were stirred with heating, while a nitrogen gas atmosphere was maintained. After 20 minutes, 195 g of 76.9 wt % urea solution heated to 80° C. was added by spraying. Heating was then conducted in an ammonia atmosphere at 250° to 270° C. for 2.5 hours to obtain 1,460 g of powdery ammonium polyphosphate. Since this ammonium polyphosphate was a mixture of primary particles and a small proportion of aggregates, it was ground with a grinder (Type AP-B, manufactured by Hosokawa Micron Corp.) in an ammonia atmosphere in order to separate the aggregates into primary particles. X-Ray diffraction revealed that the ammonium polyphosphate obtained was of the II type and had an average particle size of 6.4 µm.

EXAMPLE 1

Into a Henschel mixer (trade name) were placed 70.5% by weight of a crystalline propylene-ethylene block copolymer (C1) (ethylene content, 8.5 wt %; MFR (temperature 230° C., load 2.16 Kgf), 20 g/10 min) as the thermoplastic resin (C), 21% by weight of the melamine-coated ammonium polyphosphate (A1), 8% by weight of a homopolymer (B1) of 2-piperazinylene-4-morpholino-1,3,5-triazine as the nitrogen-containing organic compound, and 0.2% by weight of 2,6-di-t-butyl-p-cresol, 0.2% by weight of dimyristyl $\beta,\beta'$-thiodipropionate and 0.1% by weight of calcium stearate as various additives. The ingredients were mixed by stirring for 3 minutes. The mixture obtained was melt-kneaded (temperature, 200° C.) using an extruder (bore diameter, 30 mm) and then extruded to obtain pellets of a flame-retardant composition. Test pieces with given dimensions were prepared from the thus-obtained pellets, and evaluated for flame retardancy, hot-water immersion test and bleed resistance. The results obtained are shown in Table 1.

EXAMPLES 2-4

Pellets were produced in the same manner as in Example 1 except that as the nitrogen-containing organic compound, a homopolymer (B2) of 2-piperazinylene-4-N,N-bis(hydroxyethyl)amino-1,3,5-triazine was used in Example 2, a copolymer (B3) of 2-piperazinylene-4-morpholino-1,3,5-triazine with 2-piperazinylene-4-N,N-bis(hydroxyethyl)amino-1,3,5-triazine in a molar ratio of 1:1 was used in Example 3, and a reaction product (B4) obtained by reacting cyanuric chloride with ethylenediamine in a molar ratio of 2:3 was used in Example 4. Test pieces were prepared from the pellets and evaluated as regards flame retardancy, hot-water immersion test and bleed resistance in the same manner as in Example 1. The results obtained are shown in Table 1.

COMPARATIVE EXAMPLES 1-4

Pellets for each of Comparative Examples 1 to 4 were prepared in the same manner as in Examples 1 to 4, respectively, except that finely powdered II-type ammonium polyphosphate (A2) was used as the component (A). Test pieces were prepared from the pellets and evaluated as regards flame retardancy, hot-water immersion test and bleed resistance. The results obtained for Comparative Examples 1 to 4 are shown in Table 1.

pylene rubber (C3) (EP-02P, manufactured by Japan Synthetic Rubber Co., Ltd.) as the thermoplastic resin (C), 18% by weight of the melamine-coated ammonium polyphosphate (A1), 6% by weight of a homopolymer (B1) of 2-piperazinylene-4-morpholino-1,3,5-triazine as the nitrogen-containing organic compound, and 0.2% by weight of 2,6-di-t-butyl-p-cresol, 0.2% by weight of dimyristyl $\beta,\beta'$-thiodipropionate and 0.1% by weight of calcium stearate as other additives. The ingredients were mixed by stirring for 3 minutes. The mixture obtained was melt-kneaded (temperature, 200° C.) by means of an extruder (bore diameter, 30 mm) and extruded to obtain pellets of a flame-retardant composition. Test pieces with given dimensions were prepared from the thus-obtained pellets, and evaluated as regards flame retardancy, hot-water immersion test and bleed resistance. The results obtained are shown in Table 2.

EXAMPLES 6-8

Pellets were produced in the same manner as in Example 5 except that as the nitrogen-containing organic compound, a homopolymer (B2) of 2-piperazinylene-4-N,N-bis(hydroxyethyl)amino-1,3,5-triazine was used in Example 6, a copolymer (B3) of 2-piperazinylene-4-morpholino-1,3,5-triazine with 2-piperazinylene-4-N,N-bis(hydroxyethyl)amino-1,3,5-triazine in a molar ratio of 1:1 was used in Example 7, and a reaction product (B4) obtained by reacting cyanuric chloride with ethylenediamine in a molar ratio of 2:3 was used in Example 8. Test pieces were prepared from the pellets and evaluated as regards flame retardancy, hot-water immersion test and bleed resistance in the same manner as in Example 5. The results obtained are shown in Table 2.

TABLE 1

| | Component Content in Flame-retardant Composition (wt %) | | | | | | Electrical Surface Resistivity ($\Omega$) | | Bleed Resistance, | |
|---|---|---|---|---|---|---|---|---|---|---|
| | Component A | | Component B | | Component C1 | Additive | Before immersion in hot water | After immersion in hot water | Number of Days | Flame Retardancy |
| Ex. 1 | A1 | 21 | B1 | 8 | 70.5 | 0.5 | $3.8 \times 10^{17}$ | $8.2 \times 10^{17}$ | 40 days | V-0 |
| Comp. Ex. 1 | A2 | 21 | B1 | 8 | 70.5 | 0.5 | $5.4 \times 10^{16}$ | $7.9 \times 10^{14}$ | 14 days | V-0 |
| Ex. 2 | A1 | 21 | B2 | 8 | 70.5 | 0.5 | $1.9 \times 10^{17}$ | $3.5 \times 10^{16}$ | 30 days | V-0 |
| Comp. Ex. 2 | A2 | 21 | B2 | 8 | 70.5 | 0.5 | $2.5 \times 10^{16}$ | $5.7 \times 10^{10}$ | 7 days | V-0 |
| Ex. 3 | A1 | 21 | B3 | 8 | 70.5 | 0.5 | $5.1 \times 10^{16}$ | $5.2 \times 10^{16}$ | 40 days | V-0 |
| Comp. Ex. 3 | A2 | 21 | B3 | 8 | 70.5 | 0.5 | $3.3 \times 10^{17}$ | $9.9 \times 10^{12}$ | 14 days | V-0 |
| Ex. 4 | A1 | 21 | B4 | 8 | 70.5 | 0.5 | $3.8 \times 10^{17}$ | $2.0 \times 10^{16}$ | 30 days | V-0 |
| Comp. Ex. 4 | A2 | 21 | B4 | 8 | 70.5 | 0.5 | $6.3 \times 10^{17}$ | $4.4 \times 10^{12}$ | 14 days | V-0 |

Component A1: melamine-coated ammonium polyphosphate
Component A2: finely powdered II-type ammonium polyphosphate
Component B1: homopolymer of 2-piperazinylene-4-morpholino-1,3,5-triazine
Component B2: homopolymer of 2-piperazinylene-4-N,N-bis(hydroxyethyl)amino-1,3,5-triazine
Component B3: copolymer of 2-piperazinylene-4-morpholino-1,3,5-triazine with 2-piperazinylene-4-N,N-bis(hydroxyethyl)amino-1,3,5-triazine in a molar ratio of 1:1
Component B4: reaction product obtained by reacting cyanuric chloride with ethylenediamine in a molar ratio of 2:3
Component C1: propylene-ethylene block copolymer (ethylene content, 8.5 wt %; MFR, 20 g/10 min), manufactured by Chisso Corp.

EXAMPLE 5

Into a Henschel mixer (trade name) were placed a combination of 55.5% by weight of a crystalline propyleneethylene block copolymer (C1) (ethylene content, 8.5 wt %; MFR (temperature 230° C., load 2.16 Kgf), 20 g/10 min), 10% by weight of polyethylene (C2) having a melt index of 6.5 g/10 min (CHISSO POLYETHY (trademark) M680 (manufactured by Chisso Corp.)) and 10% by weight of an ethylene-pro-

COMPARATIVE EXAMPLES 5-8

Pellets for each of Comparative Examples 5 to 8 were prepared in the same manner as in Examples 5 to 8, respectively, except that finely powdered II-type ammonium polyphosphate (A2) was used as the component (A). Test pieces were prepared from the pellets and evaluated as regards flame retardancy, hot-water immersion test and bleed resistance. The results obtained for Comparative Examples 5 to 8 are shown in Table 2.

TABLE 2

| | Component Content in Flame-retardant Composition (wt %) | | | | | | | | Electrical Surface Resistivity (Ω) | | Bleed Resistance, Number of Days | Flame Retardancy |
|---|---|---|---|---|---|---|---|---|---|---|---|---|
| | Component A | | Component B | | Component C | | | Additive | Before immersion in hot water | After immersion in hot water | | |
| | | | | | C1 | C2 | C3 | | | | | |
| Ex. 5 | A1 | 18 | B1 | 6 | 55.5 | 10 | 10 | 0.5 | $2.1 \times 10^{17}$ | $9.4 \times 10^{18}$ | 40 days | V-0 |
| Comp. Ex. 5 | A2 | 18 | B1 | 6 | 55.5 | 10 | 10 | 0.5 | $9.4 \times 10^{18}$ | $6.3 \times 10^{10}$ | 20 days | V-0 |
| Ex. 6 | A1 | 18 | B2 | 6 | 55.5 | 10 | 10 | 0.5 | $2.5 \times 10^{17}$ | $1.3 \times 10^{17}$ | 40 days | V-0 |
| Comp. Ex. 6 | A2 | 18 | B2 | 6 | 55.5 | 10 | 10 | 0.5 | $9.4 \times 10^{18}$ | $6.7 \times 10^{10}$ | 14 days | V-0 |
| Ex. 7 | A1 | 18 | B3 | 6 | 55.5 | 10 | 10 | 0.5 | $3.2 \times 10^{17}$ | $3.8 \times 10^{18}$ | 40 days | V-0 |
| Comp. Ex. 7 | A2 | 18 | B3 | 6 | 55.5 | 10 | 10 | 0.5 | $1.2 \times 10^{16}$ | $6.3 \times 10^{14}$ | 20 days | V-0 |
| Ex. 8 | A1 | 18 | B4 | 6 | 55.5 | 10 | 10 | 0.5 | $1.1 \times 10^{18}$ | $6.3 \times 10^{18}$ | 40 days | V-0 |
| Comp. Ex. 8 | A2 | 18 | B4 | 6 | 55.5 | 10 | 10 | 0.5 | $1.9 \times 10^{17}$ | $5.9 \times 10^{11}$ | 14 days | V-0 |

Component C1: propylene-ethylene block copolymer (ethylene content, 8.5 wt %; MFR, 20 g/10 min), manufactured by Chisso Corp.
Component C2: polyethylene resin CHISSO POLYETHY (trademark) M680, manufactured by Chisso Corp.
Component C3: ethylene-propylene rubber EP-02P, manufactured by Japan Synthetic Rubber Co., Ltd.
Component A and Component B are the same as in Table 1.

EXAMPLE 9

Into a Henschel mixer (trade name) were placed 66.5% by weight of low-density polyethylene (C4) (PETROCEN 186 (trademark), manufactured by Tosoh Corp.) as the thermoplastic resin (C), 24% by weight of the melamine-coated ammonium polyphosphate (A1), 9% by weight of a homopolymer (B1) of 2-piperazinylene-4-morpholino-1,3,5-triazine as the nitrogen-containing organic compound, and 0.2% by weight of 2,6-di-t-butyl-p-cresol, 0.2% by weight of dimyristyl $\beta,\beta'$-thiodipropionate and 0.1% by weight of calcium stearate as various additives. The ingredients were mixed by stirring for 3 minutes. The mixture obtained was melt-kneaded at a temperature of 200° C. by means of an extruder having a bore diameter of 30 mm and was extruded to obtain pellets of a flame-retardant composition. Test pieces with given dimensions were prepared from the pellets, and evaluated for flame retardancy, hot-water immersion test and bleed resistance. The results obtained are shown in Table 3.

EXAMPLE 10

Pellets were produced in the same manner as in Example 9 except that a reaction product (B4) obtained by reacting cyanuric chloride with ethylenediamine in a molar ratio of 2:3 was used as the nitrogen-containing organic compound. Test pieces were prepared from the pellets and evaluated as regards flame retardancy, hot-water immersion test and bleed resistance in the same manner as in Example 9. The results obtained are shown in Table 3.

EXAMPLE 11

Into a Henschel mixer (trade name) were placed 63.5% by weight of an acrylonitrile-butadiene-styrene copolymer resin (C5) (ABS resin; STYLAC ABS101 (trademark), manufactured by Asahi Chemical Industry Co. Ltd.) as the thermoplastic resin (C), 26% by weight of the melamine-coated ammonium polyphosphate (A1), 10% by weight of a homopolymer (B1) of 2-piperazinylene-4-morpholino-1,3,5-triazine as the nitrogen-containing organic compound, and 0.2% by weight of 2,6-di-t-butyl-p-cresol, 0.2% by weight of dimyristyl $\beta,\beta'$-thiodipropionate and 0.1% by weight of calcium stearate as various additives. The ingredients were mixed by stirring for 3 minutes. The mixture obtained was pelletized in the same manner as in Example 9, and test pieces were prepared from the pellets and evaluated as regards flame retardancy, hot-water immersion test and bleed resistance in the same manner as in Example 9. The results obtained are shown in Table 3.

EXAMPLE 12

Pellets were produced in the same manner as in Example 11 except that a polystyrene resin (C6) (STYRON 475S (trademark), manufactured by Asahi Chemical Industry Co., Ltd.) was used as the thermoplastic resin (C). Test pieces were prepared from the pellets and evaluated as regards flame retardancy, hot-water immersion test and bleed resistance in the same manner as in Example 11. The results obtained are shown in Table 3.

COMPARATIVE EXAMPLES 9-12

Pellets for each of Comparative Examples 9 to 12 were prepared in the same manner as in Examples 9 to 12, respectively, except that finely powdered II-type ammonium polyphosphate (A2) was used as the component (A). Test pieces were prepared from the pellets and evaluated as regards flame retardancy, hot-water immersion test and bleed resistance. The results obtained for Comparative Examples 9 to 12 are shown in Table 3.

TABLE 3

| | Component Content in Flame-retardant Composition (wt %) | | | | | | | Electrical Surface Resistivity (Ω) | | Bleed Resistance, Number of Days | Flame Retardancy |
|---|---|---|---|---|---|---|---|---|---|---|---|
| | Component A | | Component B | | Component C | | Additive | Before immersion in hot water | After immersion in hot water | | |
| Ex. 9 | A1 | 24 | B1 | 9 | C4 | 66.5 | 0.5 | $2.2 \times 10^{18}$ | $3.6 \times 10^{11}$ | 30 days | V-0 |

TABLE 3-continued

| | Component Content in Flame-retardant Composition (wt %) | | | | | | | Electrical Surface Resistivity (Ω) | | Bleed Resistance, Number of Days | Flame Retardancy |
|---|---|---|---|---|---|---|---|---|---|---|---|
| | Component A | | Component B | | Component C | | Additive | Before immersion in hot water | After immersion in hot water | | |
| Comp. Ex. 9 | A2 | 24 | B1 | 9 | C4 | 66.5 | 0.5 | $3.8 \times 10^{17}$ | $5.4 \times 10^{8}$ | 7 days | V-0 |
| Ex. 10 | A1 | 24 | B4 | 9 | C4 | 66.5 | 0.5 | $1.3 \times 10^{18}$ | $8.6 \times 10^{16}$ | 30 days | V-0 |
| Comp. Ex. 10 | A2 | 24 | B4 | 9 | C4 | 66.5 | 0.5 | $6.5 \times 10^{17}$ | $4.7 \times 10^{8}$ | 7 days | V-0 |
| Ex. 11 | A1 | 26 | B1 | 10 | C5 | 63.5 | 0.5 | $2.5 \times 10^{15}$ | $5.2 \times 10^{15}$ | 30 days | V-0 |
| Comp. Ex. 11 | A2 | 26 | B1 | 10 | C5 | 63.5 | 0.5 | $3.6 \times 10^{15}$ | $9.9 \times 10^{11}$ | 7 days | V-0 |
| Ex. 12 | A1 | 26 | B1 | 10 | C6 | 63.5 | 0.5 | $1.5 \times 10^{17}$ | unable to be measured* | 30 days | V-0 |
| Comp. Ex. 12 | A2 | 26 | B1 | 10 | C6 | 63.5 | 0.5 | $5.4 \times 10^{17}$ | unable to be measured* | 14 days | V-0 |

Component C4: low-density polyethylene PETROCEN 186, manufactured by Tosoh Corp.
Component C5: ABS resin STYLAC ABS101, manufactured by Asahi Chemical Industry Co., Ltd.
Component C6: polystyrene resin STYRON 475S, manufactured by Asahi Chemical Industry Co., Ltd.
Component A and Component B are the same as in Table 1.
*Unable to be measured because of severe thermal deformation in hot water.

As apparent from Tables 1 to 3, significantly improved bleed resistance is obtained even under high-temperature and high-humidity conditions by incorporating the melamine-coated ammonium polyphosphate.

Since the flame-retardant thermoplastic resin composition of the present invention employs, having incorporated therein, a melamine-coated ammonium polyphosphate obtained by sublimating melamine and adding and/or adhering it onto the particle surfaces of ammonium polyphosphate, molded materials obtained from the resin composition undergo almost no bleeding of ammonium polyphosphate even under high-temperature and high-humidity conditions. In addition, the molded materials not only have excellent flame retardancy, but also are free from the generation of decomposition gases, etc. during molding. Therefore, the composition is suitable for use in the fields of various molded articles to be used under high-temperature and high-humidity conditions, e.g., in the field of electrical parts.

While the invention has been described in detail and with reference to specific examples thereof, it will be apparent to one skilled in the art that various changes and modifications can be made therein without departing from the spirit and scope thereof.

What is claimed is:

1. A flame-retardant thermoplastic resin composition comprising, (A) 10 to 40% by weight of a melamine-coated ammonium polyphosphate having melamine coated on particle surfaces of a powdery ammonium polyphosphate expressed by the following formula (I):

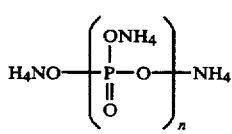

(I)

wherein n is an integer of 2 or more, (B) 1 to 20% by weight of a nitrogen-containing compound comprising a homopolymer and/or copolymer which is derived from at least two monomers, each having a monomer structure as the main unit, expressed by the following formula (II):

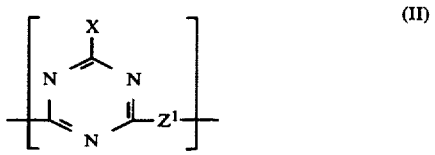

(II)

wherein X and $Z^1$ each are a structure bonded to the triazine skeleton through a nitrogen atom; X is an alkylamino group represented by —$NHR^1$ or —$NR^2R^3$ wherein $R^1$, $R^2$ and $R^3$ are each a linear or branched alkyl group having 1 to 6 carbon atoms and $R^2$ and $R^3$ may be same or different, a morpholino group, or a piperidino group, or X is a hydroxyalkylamino group represented by —$NHR^4$ or —$NR^5R^6$ wherein $R^4$, $R^5$ and $R^6$ each are a linear or branched hydroxyalkyl group having 2 to 6 carbon atoms and $R^5$ and $R^6$ may be the same or different; and $Z^1$ is a divalent group of piperazine, a divalent group represented by —$HN(CH_2)_m$-HN— wherein m is an integer of 2 to 6, or a group represented by —$NR^7(CH_2)_lR^8N$— wherein either one of $R^7$ and $R^8$ is a hydroxyethyl group and the other is a hydrogen atom or both of $R^7$ and $R^8$ are hydroxyethyl groups, and l is an integer of 2 to 6, and (C) 89 to 40% by weight of a thermoplastic resin, the total amount of these components being 100% by weight.

2. A flame-retardant thermoplastic resin composition according to claim 1, wherein the amount of the melamine used in coating the particle surfaces of the powdery ammonium polyphosphate is 0.5 to 20% by weight based on the amount of the powdery ammonium polyphosphate.

3. A flame-retardant thermoplastic resin composition according to claim 1, wherein the melamine-coated ammonium polyphosphate is obtained by sublimating melamine and adding and/or adhering it onto the particle surfaces of the powdery ammonium polyphosphate.

4. A flame-retardant thermoplastic resin composition according to claim 1, wherein the melamine-coated ammonium polyphosphate has an average particle size of 15 μm or smaller.

5. A flame-retardant thermoplastic resin composition according to claim 1, wherein the nitrogen-containing organic compound is a reaction product of cyanuric chloride and a diamine.

6. A flame-retardant thermoplastic resin composition according to claim 1, wherein the thermoplastic resin is selected from the group consisting of olefin resins, styrene resins and a mixture of two or more of these.

7. A flame-retardant thermoplastic resin composition according to claim 1 wherein said powdery ammonium polyphosphate comprises an ammonium polyphosphate stoichiometrically deficient in ammonia.

8. A flame-retardant thermoplastic resin composition according to claim 7 wherein said deficiency corresponds to about 5 to about 10% by weight of the stoichiometric amount of ammonia.

9. A flame-retardant thermoplastic resin composition according to claim 7 wherein said stoichiometrically deficient ammonium polyphosphate is one characterized by a 1 weight % aqueous suspension thereof producing a pH of about 4.0 to about 6.0.

10. A flame-retardant thermoplastic resin composition according to claim 2 wherein the concentration of melamine is about 2 to about 10% by weight.

11. A flame-retardant thermoplastic resin composition according to claim 1 wherein the concentration of melamine-coated ammonium polyphosphate is about 15% to about 25% by weight.

12. A flame-retardant thermoplastic resin composition according to claim 1 wherein said nitrogen-containing compound is the homopolymer of 2-piperazinylene-4-N,N-bis(hydroxyethyl)amino-1,3,5-triazine.

13. A flame-retardant thermoplastic resin composition according to claim 1 wherein said nitrogen-containing compound is the homopolymer of 2-piperazinylene-4-morpholino-1,3,5-triazine.

14. A flame-retardant thermoplastic resin composition according to claim 1 wherein said nitrogen-containing compound is a copolymer of 2-piperazinylene-4-morpholino-1,3,5-triazine and 2-piperazinylene-4-N,N-bis(hydroxyethyl)amino-1,3,5-triazine.

15. A flame-retardant thermoplastic resin composition according to claim 1 wherein said nitrogen-containing compound is the reaction product of cyanuric chloride and ethylene diamine in a molar ratio of 2:3.

16. A flame-retardant thermoplastic resin composition according to claim 1 wherein the thermoplastic resin comprises a polypropylene resin.

17. A flame-retardant thermoplastic resin composition according to claim 1 wherein the thermoplastic resin comprises a polyethylene resin.

18. A flame-retardant thermoplastic resin composition according to claim 1 wherein the thermoplastic resin comprises a styrene resin.

19. A flame-retardant thermoplastic resin composition according to claim 1 wherein the thermoplastic resin comprises an ABS resin.

* * * * *